Figure 1:
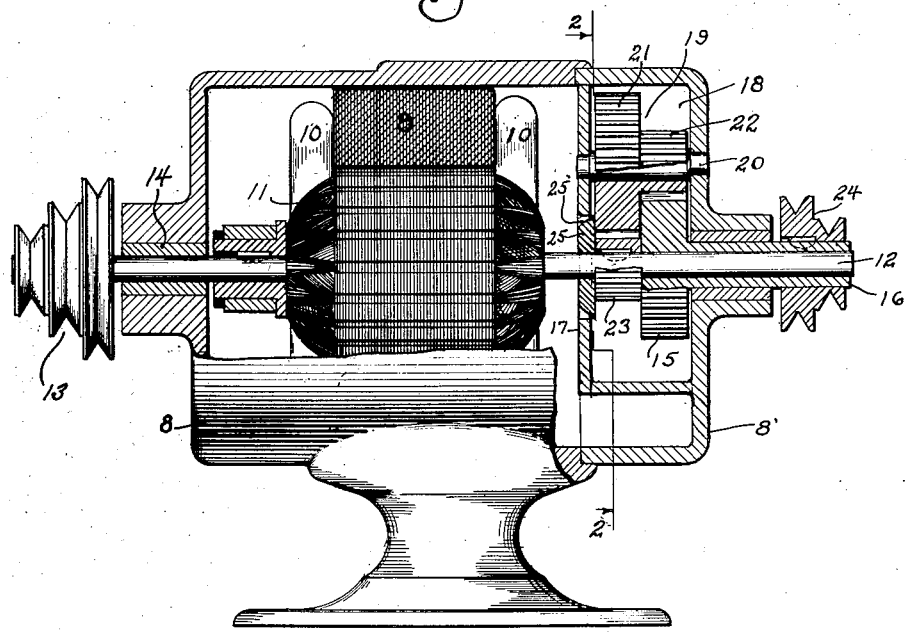

Jan. 6, 1925.

C. W. H'DOUBLER 1,521,882

MOTOR TRANSMISSION MECHANISM

Filed Nov. 18, 1920

Patented Jan. 6, 1925.

1,521,882

UNITED STATES PATENT OFFICE.

CHARLES W. H'DOUBLER, OF RACINE, WISCONSIN.

MOTOR-TRANSMISSION MECHANISM.

Application filed November 18, 1920. Serial No. 424,936.

*To all whom it may concern:*

Be it known that I, CHARLES W. H'DOU-BLER, a citizen of the United States, and resident of Racine, in the county of Racine and State of Wisconsin, have invented new and useful Improvements in Motor-Transmission Mechanism, of which the following is a description, reference being had to the accompanying drawings, which are a part of this specification.

This invention relates to improvements in motor transmission mechanism, more particularly adapted for small electric motors.

The armatures of small electric motors rotate at a very high speed and in order to efficiently use the motors it is necessary to transmit the motion at comparatively a slow rate of speed by mechanism which will occupy but a minimum amount of space.

It is one of the objects of the present invention to provide a construction which will accomplish the before mentioned results in a very simple and efficient manner.

A further object of the invention is to provide an electric motor having a transmission mechanism mounted within the motor casing and enclosed therein in a very simple manner.

A further object of the invention is to provide a motor transmission mechanism arranged to transmit motion at armature speed or at a speed considerably less than armature speed.

A further object of the invention is to provide a motor transmission mechanism in which the armature shaft extends through the sleeve of the working parts and rotates in the same direction as said sleeve.

A further object of the invention is to provide a motor transmission mechanism which is of very simple construction, is strong and durable, and is well adapted for the purpose described.

With the above and other objects in view, the invention consists of the improved motor transmission mechanism and its parts and combinations as set forth in the claims, and all equivalents thereof.

Figure 2:
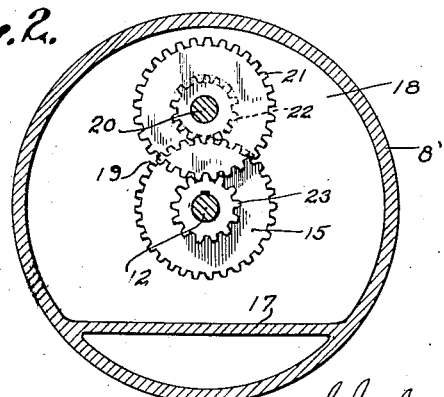

In the accompanying drawings in which the same reference characters indicate the same parts in all of the views:

Fig. 1 is a side view, partly in section, of an electric motor provided with the improved transmission mechanism; and Fig. 2 is a transverse sectional view thereof taken on line 2—2 of Fig. 1.

Referring to the drawings, the numeral 8 indicates a motor casing of cylindrical form in cross section which encloses the field magnets 9 and their windings or coils 10 and the armature 11. The armature 11 is mounted on a shaft 12 which extends through the opposite ends of the casing and on one end is provided with a grooved cone wheel 13. One end portion of the shaft is journaled in and extends through the end bearing 14 while the other end portion is journaled in and extends through a gear wheel 15 and its hub portion 16. Said hub portion 16 extends through and has its bearing in the end portion of the case end extension 8' which forms part of the casing 8. The extension casing 8' is recessed in the casing 8 and is provided with an inner cover or partition 17 to form an enclosure 18 in which the transmission gearing 19 is positioned. A fixed stud shaft 20 is mounted in the upper portion of the enclosure 18 in alinement with the armature shaft 12. A gear wheel 21 and a pinion 22 preferably of integral structure are journaled on the stud shaft 20, and the pinion 22 is in mesh with the gear 15 which surrounds the armature shaft 12. A pinion 23 keyed on the armature shaft 12 is in mesh with the gear 21.

As the motor rotates its armature, the pinion 23 will transmit motion to the gear 21 at a reduced rate of speed, and the pinion 22 turning with the gear will transmit motion to the gear 15 at a further reduction in speed. A grooved stepped pulley 24 keyed on the outer end of the hub 16 provides for a belted transmission of the power from said end of the motor.

An oil disk 25 having a bevelled peripheral edge 25' is mounted on the shaft 12 adjacent the shaft opening of the inner partition 17 to throw the lubricating oil away from the opening and retain the same within the gear casing.

It is to be understood that the relative size of the gears and pinions may be transposed to increase the speed of the outer rotary member above the armature speed for high speed grinding or other purposes where high speed is essential.

From the foregoing description, it will be seen that power may be taken from one end of the motor at motor speed and at the other end of the motor at a greatly reduced speed and that the gear journaled on the armature shaft rotates in the same direction as the shaft.

What I claim as my invention is:

1. A motor transmission mechanism, comprising a motor having an armature shaft, a casing enclosing the motor and through which the shaft extends at both ends, a pinion fast on the shaft within the casing, a stud shaft fixedly mounted in the casing, a gear wheel positioned within the casing and journaled on the stud shaft and in mesh with the pinion, a pinion within the casing and journaled on the stud shaft and connected to the gear wheel, a gear wheel within the casing and journaled on the armature shaft and in mesh with the stud shaft pinion and having a hub portion which projects through the casing, a driven member mounted on one end of the shaft, and a driven member mounted on the outer portion of the sleeve at the other end of the shaft.

2. A motor transmission mechanism, comprising a motor having an armature shaft, a casing enclosing the motor and through one end portion of which the shaft extends, a pinion fast on the shaft, a stud shaft mounted in the casing and extending parallel to the armature shaft, a gear wheel journaled on the stud shaft and in mesh with the pinion, a pinion journaled on the stud shaft and connected to the gear wheel, a gear wheel journaled on the armature shaft and in mesh with the stud shaft pinion and having a hub portion which extends through the casing end opposite to the end through which the shaft extends, and driven members mounted on the armature shaft and the hub portion outside of the casing.

3. A motor transmission mechanism, comprising a motor having an armature shaft, a casing enclosing the motor and having an inner partition which forms a transmission chamber, said armature shaft extending through the casing and the partition, a pinion fast on the shaft within the transmission chamber, a stud shaft mounted within the chamber, a gear wheel journaled on the stud shaft and in mesh with the pinion, a pinion on the stud shaft and connected to the gear wheel, a gear wheel surrounding the armature shaft and in mesh with the stud shaft pinion, said armature shaft gear wheel having an elongated hub which extends through and has its bearing in one end of the casing, a driven wheel on the outer end portion of the hub, and a driven wheel on the outer end portion of the armature shaft.

4. A motor transmission mechanism, comprising a motor having an armature, a casing enclosing the motor, an extension casing mounted on one end portion of the casing and having an inner partition forming a transmission chamber, said shaft extending through the casing and the extension and the partition, a pinion fast on the shaft within the transmission chamber and mounted in the extension and the partition, a gear wheel journaled on the stud shaft and in mesh with the pinion, a pinion integral with the gear wheel and journaled on the stud shaft, a gear wheel journaled on the armature shaft and in mesh with the stud shaft pinion and having an elongated hub portion which extends through and is journaled in the extension casing, a wheel mounted on the outer end portion of the hub, and a wheel mounted on the outer end portion of the armature shaft opposite to the end of the shaft surrounded by the elongated hub.

In testimony whereof, I affix my signature.

CHARLES W. H'DOUBLER.